June 25, 1935.  B. BEARDSLEY ET AL  2,006,294
DRAG CONVEYER CHANNEL
Filed Jan. 21, 1932
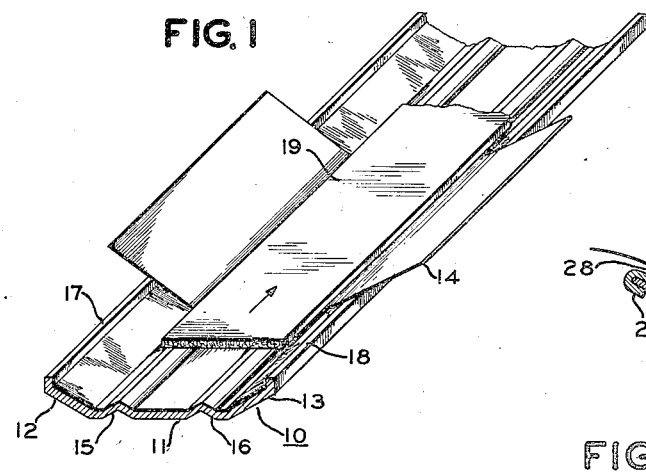
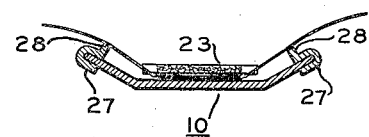
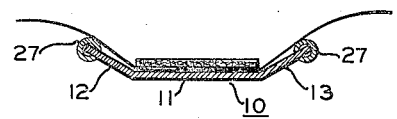
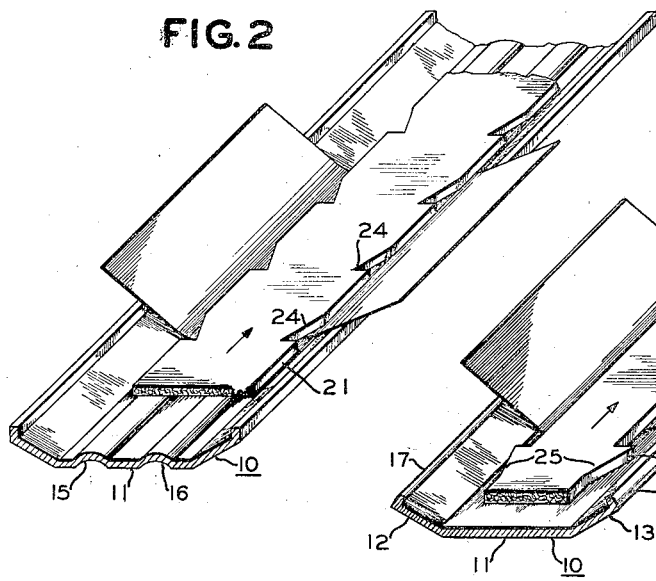
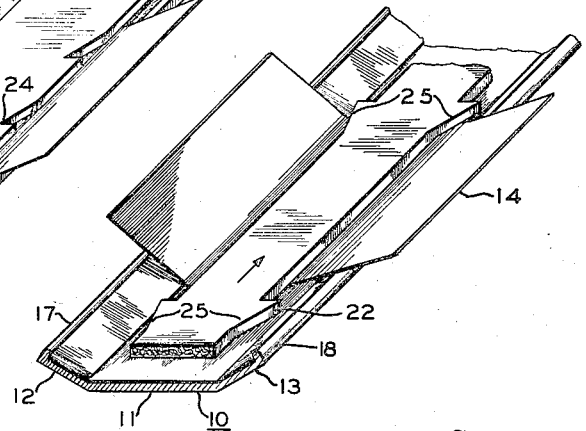
Inventors
B. BEARDSLEY
A. PLAUSICS
By their Attorney
Eugene C. Brown Patented June 25, 1935

2,006,294

UNITED STATES PATENT OFFICE 2,006,294

DRAG CONVEYER CHANNEL

Bruce Beardsley, Brooklyn, and Alexander Plausics, New York, N. Y., assignors to The Western Union Telegraph Company, New York, N. Y., a corporation of New York Application January 21, 1932, Serial No. 588,012

12 Claims. (Cl. 198—160)

This invention relates to drag conveyers for conveying sheet material such as messages, telegraph blanks and the like; and more particularly to the form of the conveyer channel and the cooperating conveyer belt traveling in the channel.

Drag conveyers have gone into quite extensive use for carrying telegram blanks, messages and the like from one part of a building to another. The most effective type of conveyer and the one which adapts itself to this type of service is a conveyer of the drag type comprising a channel or guide member of relatively less width than the sheets to be conveyed and a belt arranged to travel along one face of the guide member to carry the sheets between it and the guide member by frictional engagement with the sheets. In its preferred form the channel or guide member embodies a central portion and outwardly flaring side portions arranged to form a substantially trough shaped member. The belt is ordinarily of substantially the same width as the central portion and travels therealong carrying the sheets of material held down between the outwardly flaring side portions against the surface of the centre portion, maintaining the sheet in a substantially nonplaniform shape.

With the type of conveyer just described it will be seen that the sheets of material are dragged along the surface of the conveyer channel and that due to the fact that the belt rides upon the sheets, the latter are maintained in contact with substantially the entire face of the conveyer member.

It is an object of this invention to provide a channel member for a drag conveyer adapted to convey sheet material in which the amount of surface in contact with the sheets is materially reduced for a given size of channel.

Another object is to provide a conveyer member embodying channel elements in the form of ridges presenting substantial line contact with the sheet material.

A further object is to provide a channel member in the form of a trough with ridges provided in the central portion of the trough for supporting the conveyer belt and the portion of the sheet traveling between the belt and the bottom of the trough and also elements in the form of ridges at the outer surface of the edges of the trough for supporting the overhanging portions of the sheet.

Still another object of the invention is to employ a channel member of the foregoing type in combination with a belt embodying serrations along its edges to more effectively engage the sheets of material.

These and other objects will be apparent from the following description taken in connection with the drawing forming a part of this application in which:

Fig. 1 shows a perspective view of the conveyer channel or trough provided with ridges in both the centre and the outwardly flaring side portions.

Fig. 2 shows a perspective view of a similar type of trough with a cooperating belt having serrations along its edges.

Fig. 3 is a perspective view of the trough in which the ridges are omitted from the central portion and employing a belt having more widely spaced serrations, and Figs. 4 and 5 show a cross-sectional view of the plain type of channel member with elements secured to the outer edges of the said portions to form the ridge members.

Referring now to Fig. 1 of the drawing, an arrangement is shown comprising a conveyer guideway or channel member 10 of substantially trough shape. The trough embodies a central portion 11 and outwardly flaring side portions 12 and 13. A sheet or message blank 14 is arranged to travel along the inner face of the trough member. Instead of the sheet traveling in direct contact with substantially the whole of the face or inner surface of the trough as heretofore, upstanding ridge members are provided in the face of the trough upon which the sheets travel. A pair of spaced ridge members 15 and 16 are provided in the central portion of the trough and side portions are provided at their outer edges with ridge members 17 and 18. Additional ridge members may be employed if desired.

A belt or traveling conveyer member 19 of substantially the same width as the central portion of the trough is arranged to travel on the ridge members 15 and 16. The arrangement is such that due to the frictional engagement between the belt and message blanks 14, the latter will be carried along the trough member with the moving belt. The central portion of the message blanks are pressed down by the weight of the belt and travel in engagement with the belt supporting ridges 15 and 16, while the outward portion of the message blank rides on the ridges 17 and 18 in the side portions. In this manner, the message blanks are supported away from the inner surface of the trough member in spaced relation thereto and ride on the ridge elements which present substantially line contact with the sheets. Inasmuch as the contact of the sheets with the surface of the conveyer channel or trough member is reduced to the amount of surface in engagement with the ridge portions the friction between the conveyer member and the sheets will be proportionately reduced. This will enable the sheets to travel along the conveyer member more easily and with less tendency to accumulate static charges which sometimes cause the sheets to adhere to the conveyer member.

In addition to the foregoing considerations where messages are conveyed which have been made up, in accordance with the present prevailing methods, of sections of gummed tape with the message printed thereon and attached to the message blank by wetting the gum adhesive material, there is a tendency for the gum to adhere to and accumulate on the channel. The accumulations of the adhesive material are very objectionable and sometimes cause the messages to stick to the conveyer channel to such an extent that they are not removed by the movement of the belt passing over them. This presents greater difficulties than those due to static accumulations on a sheet because the latter causes only momentary stoppage of the sheets, due to the fact that the static charge leaks off; whereas, stoppage due to gum accumulations are likely to cause a continued hold-up of the progress of the sheet and may even cause the conveyer section to become choked by accumulation of additional sheets arriving at that point. When this occurs it is usually necessary to stop the conveyer and clean all the gum accumulations from the conveyer trough member. Therefore, any arrangement which will decrease the likelihood of gum accumulations and reduce the number of times that a shut down is necessary is of considerable importance. However, by reducing the channel surface in contact with the sheets, by providing supporting ridges, according to this invention these difficulties are obviated.

Referring to Fig. 2, an arrangement similar to that shown in Fig. 1 is illustrated. The conveyer channel 10 is of substantially the same formation except that the ridge elements 15 and 16 embodied in the central section are crowned or rounded at the top. This may be desirable in certain instances where the sharp top ridge causes excessive wear in the conveying surface of the belt or has sufficient abrasive effect on the message blanks to mar the surface thereof.

It will be observed that the conveyer member is of such shape that the sheets are held in non-planiform shape while they are engaged between it and the belt. The upwardly conveying side portions of the conveyer member cause the sheets to be bent upwardly where they extend out beyond the edge of the conveyer belt. When a ridge member is employed along the side portions, it will be apparent from the illustrations in the drawing that there is a tendency to urge the message blank upward at the edge of the belt and to hold the same in spaced relation to the conveyer channel. With this arrangement a conveyer belt such as belts 21, 22 and 23 in Figs. 2, 3 and 4 respectively, having serrations or notches in their edges may be employed to take advantage of the spaced relation of the sheets as they travel in the conveyer channel. This provides travelling conveyer elements in the nature of "clean out" elements which extend outwardly into the space between the message blanks and the face of the channel so as to engage the trailing edges of the sheets to carry the same along in order to further insure against a tendency for the sheet to stick or adhere to the channel.

Referring to Fig. 2, the belt 21 is provided with a series of serrations 24 disposed at relatively close intervals. The belt in Fig. 3 is arranged so that the serrations are relatively wide and have the effect of reducing the width of the body of the belt, leaving projections 25 extending outwardly at the sides of the belt at relatively widely spaced intervals. The belt illustrated in Fig. 4 may be of either of the foregoing types or any other arrangement which will provide elements at the edges of the belt to project out into the space between the message and the face of the conveyer member.

In certain instances it may be desirable on account of the type of belt employed or the speed of its travel along the conveyer member or other considerations to omit the ridge members from the central portion of the conveyer channel and permit the belt to ride in substantial engagement with the face of the central portion. In such cases, the ridge members would be provided in the outwardly flaring side members only. As illustrated in Fig. 3, the ridge members 17 and 18 are integral with the channel member substantially as in Figs. 1 and 2. In Figs. 4 and 5, the ridge member is provided by a bead element 27 which may be secured to the edges of the side members 12 and 13 by crimping or otherwise fastening the element on the edge of the channel.

In Fig. 4, the bead member is provided with an upstanding portion to form a ridge 28 substantially at the outer edges of the channel member 10. In Fig. 5, the bead member is illustrated as comprising an element of C-shape cross section on which the outwardly extending portion of the sheets ride.

With regard to the tendency of the drag channel to urge the messages upward against the edge of the belt, this tendency will be present to some extent in any type which is wider than the belt, and is provided with upwardly flaring side portions. When the belt is provided with serrations or projections along the edge portion thereof there will likewise be a tendency to urge the message blank up against such serrated edge or up in between the projections along such edge. Thus in the case of the embodiment illustrated in Fig. 3, the message blank 14 would be urged upwardly along the edges of the belt even if the bead members 17 and 18 were not provided along the outer edges of the conveyer channel. If the projections along the edges of the belt are spaced at a greater distance than the width of the sheets to be conveyed, the urging of the sheets upward against the edge of the belt is quite effective to bring the side portions of the message in front of the projections along the edge of the belt as the belt moves over the sheet in case the sheet has a tendency to stick or lag in its travel. It will be appreciated, however, that this arrangement is not as effective as where the upwardly extending ridge portions along the face of the conveyer channel holds the sheets out of engagement with the channel, particularly along the upwardly flaring side members thereof.

From the foregoing description it will be observed that we have provided an arrangement for decreasing the frictional engagement between sheets of material conveyed along the conveyer channel by decreasing the amount of surface engagement between the channel and the sheets to a plurality of substantially line contacts. We have also provided a conveyer channel in which the effect of static accumulations on the sheets tending to cause the same to stick or adhere to the channel is minimized, and which in addition minimizes the possibility of the accumulation of the gum or adhesive substances employed in making up the present day type of telegraph message.

While we have shown our invention in several forms, it will be obvious to those skilled in the art that it is not limited to these forms, but is susceptible to various other changes and modifications without departing from the spirit thereof and we desire therefore that only such limitations shall be placed thereon as are imposed by the prior art or as specifically set forth in the appended claims.

What we claim is:

1. In a drag conveyer for sheet material, the combination of a conveyer guideway, a belt arranged to travel along the face of the guideway for conveying sheets of material between it and the guideway, said guideway having a greater width than the belt and a less width than the sheets, said guideway being provided along its outer edges beyond the edges of the belt with longitudinally extending members protruding above the face thereof for holding the edge portions of the sheets out of contact with the said face.

2. In a drag conveyer for sheet material, the combination of a conveyer guide member having a less width than the sheets and embodying a central portion and upwardly extending side portions, a belt having serrations along its edge and arranged to travel along the central portion of said member for conveying sheets of material between it and the member, said guide member being provided along the outer edges of the side portions thereof with longitudinally extending members protruding from the side portions to engage the outer portions of the sheets for urging the sheets upwardly along the edges of the belt to engage the serrations therein.

3. A drag conveyer for sheet material comprising a stationary trough embodying a central portion and upwardly flaring side portions, one or more upstanding ridges being provided in the central and side portions respectively, a flat belt adapted to travel along the central portion of the trough in frictional engagement with the ridges therein, whereby sheets of material may be conveyed between the belt and the trough by frictional engagement with the ridges only.

4. A drag conveyer for sheet material comprising a conveyer member of substantial trough shape embodying a central portion and outwardly flaring side portions for providing a guideway of substantially non-planiform transverse cross section along the face of which sheets of material are conveyed, and a belt arranged to travel along said central portion, said trough being provided with upstanding ridges in the central and side portions thereof for holding the sheets of material in spaced relation to the face of the trough, said belt being provided with serrations along its edges arranged to protrude beyond the trailing edges of the sheets into the space between the sheets and the face of the channel for carrying forward any sheets which may be impeded in their progress along the channel or have a tendency to stop therein.

5. A drag conveyer for sheet material comprising a conveyer member of substantially trough shape embodying a central portion and outwardly flaring side portions providing a channel of substantially non-paniform transverse cross section along which sheets of material are conveyed, a belt arranged to travel along said central portions, said trough being provided with upstanding ridges along the face of the side portions thereof for holding the side portions of the sheets of material extending from the belt over the edges of the channel in spaced relation to the face of the trough side portions, said belt being provided with serrations along its edges arranged to protrude beyond the trailing edges of the sheets into the space between the sheets and the face of the trough side portions for carrying forward any sheets which may be impeded in their progress along the channel or have a tendency to stop therein.

6. A drag conveyer for sheet material, comprising a conveyer member embodying a central portion and upwardly extending side portions for providing a guideway along the face of which sheets of material are conveyed, and a belt arranged to travel along said central portion, said belt being provided with projections along its edges spaced at distances not less than the width of the sheets to be conveyed, said projections being arranged to protrude beyond the trailing edges of the sheets to positively engage the same to carry the sheets forward and thereby prevent the same being impeded in their progress along the channel due to a tendency to adhere thereto.

7. In a drag conveyer for sheet material, the combination of a conveyer guide member embodying a central portion and upwardly extending side portions, a belt of substantially the same width as the central portion of said guide member, said belt being provided with serrations at its edges and being arranged to travel along said central portion for conveying sheets of material between it and the member, the upwardly extending side portions of said guide member cooperating with the belt and central portion to support the sheet in a non-planiform shape and acting to urge the sheets upwardly at the edges of the belt to engage the serrations therein.

8. In a drag conveyer for sheet material, the combination of a conveyer guideway, a belt arranged to travel along the face of the guideway for conveying sheets of material between it and the guideway, said guideway having a greater width than the belt and a less width than the sheets, said guideway having longitudinally extending members secured along its outer edges and arranged to protrude above the face thereof for holding the edge portions of the sheets out of contact with said face.

9. In a drag conveyer for sheet material, the combination of a conveyer guideway, a belt arranged to travel along the face of the guideway for conveying sheets of material between it and the guideway, said guideway having a greater width than the belt and a less width than the sheets, said guideway having longitudinally extending members removably attached along its outer edges and arranged to protrude above the face thereof for holding the edge portions of the sheets out of contact with said face.

10. In a drag conveyer for sheet material, the combination of a conveyer guideway and a belt of less width than the sheets to be conveyed arranged to travel centrally along the face of the guideway for conveying sheets of material between it and the guideway, said guideway embodying means to press the outward portions of the sheets upwardly out of the plane of contact with the face of the belt so as to bend the sheets along the lateral edges of the belt and urge them into firm contact with the face portion of the belt adjacent said lateral edges, said guideway also embodying longitudinally extending supporting means for the belt arranged to engage the face of the belt remotely from said lateral edges whereby the frictional characteristics of the surface of the belt face adjacent said lateral edges are preserved unimpaired by the action of the supporting elements upon the belt as the latter slides thereover.

11. A drag belt sheet conveyer line comprising a track extending along the line and having longitudinal track ribs, and a drag conveyer belt trained along said track and having a conveyer face directly opposed to the crests of said ribs to convey an interposed sheet along the rib crests, the crests being narrow in comparison with the width of said belt face.

12. A drag belt sheet conveyer line comprising a belt trained along the line and having a sheet-engaging conveyer face; and sheet guiding and supporting means formed of stiff sheet material and bent along longitudinal lines to form integral transversely spaced ribs extending along the line side by side and tapering toward their crests in cross section, the rib crests being narrow in comparison with said belt face and directly opposed to said belt face to hold a sheet to the belt for drag conveyance along the crests.

BRUCE BEARDSLEY.
ALEXANDER PLAUSICS.